US007990700B2

(12) United States Patent
Guo

(10) Patent No.: US 7,990,700 B2
(45) Date of Patent: Aug. 2, 2011

(54) ELECTRONIC DEVICE ENCLOSURE

(75) Inventor: Lei Guo, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 61 days.

(21) Appl. No.: 12/509,169

(22) Filed: Jul. 24, 2009

(65) Prior Publication Data

US 2010/0296237 A1 Nov. 25, 2010

(30) Foreign Application Priority Data

May 25, 2009 (TW) .............................. 10302522.5 A

(51) Int. Cl.
*H05K 7/20* (2006.01)
(52) U.S. Cl. .............. 361/679.48; 361/679.51; 361/694; 361/695; 165/121; 165/122; 454/184
(58) Field of Classification Search ............ 361/679.46, 361/679.48, 679.49, 679.6, 690–697, 717–727, 361/736, 753; 454/184; 165/80.2, 80.3, 165/96, 100–103, 121, 122; 248/505, 510, 248/680, 694; 174/16.1, 16.3, 252; 415/213.1
See application file for complete search history.

(56) References Cited

U.S. PATENT DOCUMENTS

| 5,871,396 | A | * | 2/1999 | Shen ............................. 454/184 |
| 6,002,586 | A | * | 12/1999 | Chen et al. .................... 361/695 |
| 6,061,237 | A | * | 5/2000 | Sands et al. ................... 361/695 |
| 6,183,214 | B1 | * | 2/2001 | Ko ................................ 417/360 |
| 6,375,561 | B1 | * | 4/2002 | Nicolai et al. ................ 454/184 |
| 6,711,015 | B2 | * | 3/2004 | Syring et al. .................. 361/695 |
| 6,744,629 | B2 | * | 6/2004 | Hidesawa ................ 361/679.48 |
| 7,238,104 | B1 | * | 7/2007 | Greenslade et al. .......... 454/184 |
| 7,372,695 | B2 | * | 5/2008 | Coglitore et al. ........ 361/679.48 |
| 7,433,830 | B2 | * | 10/2008 | Ingman et al. .................... 705/9 |
| 7,492,592 | B2 | * | 2/2009 | Ye et al. ........................ 361/695 |
| 7,542,272 | B2 | * | 6/2009 | Pike et al. ................ 361/679.48 |
| 7,773,369 | B2 | * | 8/2010 | Dornauer et al. ............. 361/676 |
| 2003/0175123 | A1 | * | 9/2003 | Yeh ................................ 416/246 |
| 2005/0180102 | A1 | * | 8/2005 | Kim ............................. 361/694 |
| 2007/0275650 | A1 | * | 11/2007 | Chen ............................. 454/184 |
| 2009/0154092 | A1 | * | 6/2009 | Chen ........................ 361/679.51 |

FOREIGN PATENT DOCUMENTS

JP     410093276 A  *  4/1998
JP   02000307278 A  *  11/2000

* cited by examiner

*Primary Examiner* — Michael V Datskovskiy
(74) *Attorney, Agent, or Firm* — D. Austin Bonderer

(57) ABSTRACT

An apparatus includes a side plate and a rear plate perpendicular to the side plate. A motherboard is mounted on the side plate. The motherboard has a heat source attached thereon. The rear plate defines a ventilation area. The ventilation and the heat source are located at different heights. A fan is mounted on the ventilation area. The fan inclines towards the plurality of expansion cards.

12 Claims, 4 Drawing Sheets

ELECTRONIC DEVICE ENCLOSURE

BACKGROUND

1. Technical Field

The present embodiment relates to electronic device enclosures, and particularly to an electronic device enclosure that has good heat dissipation ability.

2. Description of Related Art

Nowadays, various electrical instruments, and especially desktop computers, are crowded with different electrical components and peripheral devices, such as the central processing units (CPUs), the graphic cards, and so on. These electrical components generate heat during operation. The inner temperature of the desktop computer enclosure can become very high. Therefore, one or more fans are often installed on the enclosure to remove the heat generated by the electrical components, to ensure that the electrical components maintain a moderate operating temperature.

In some situation, users often update the hardware configuration of the computer, such as adding more power electrical components, or change electrical components. After users do these changes, a heat dissipation balance of the enclosure is usually broken. For example, when an electrical component which generates much heat is added, and the original fans of the enclosure can not drive air flowing to the electrical component, the electric component is often overheated.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
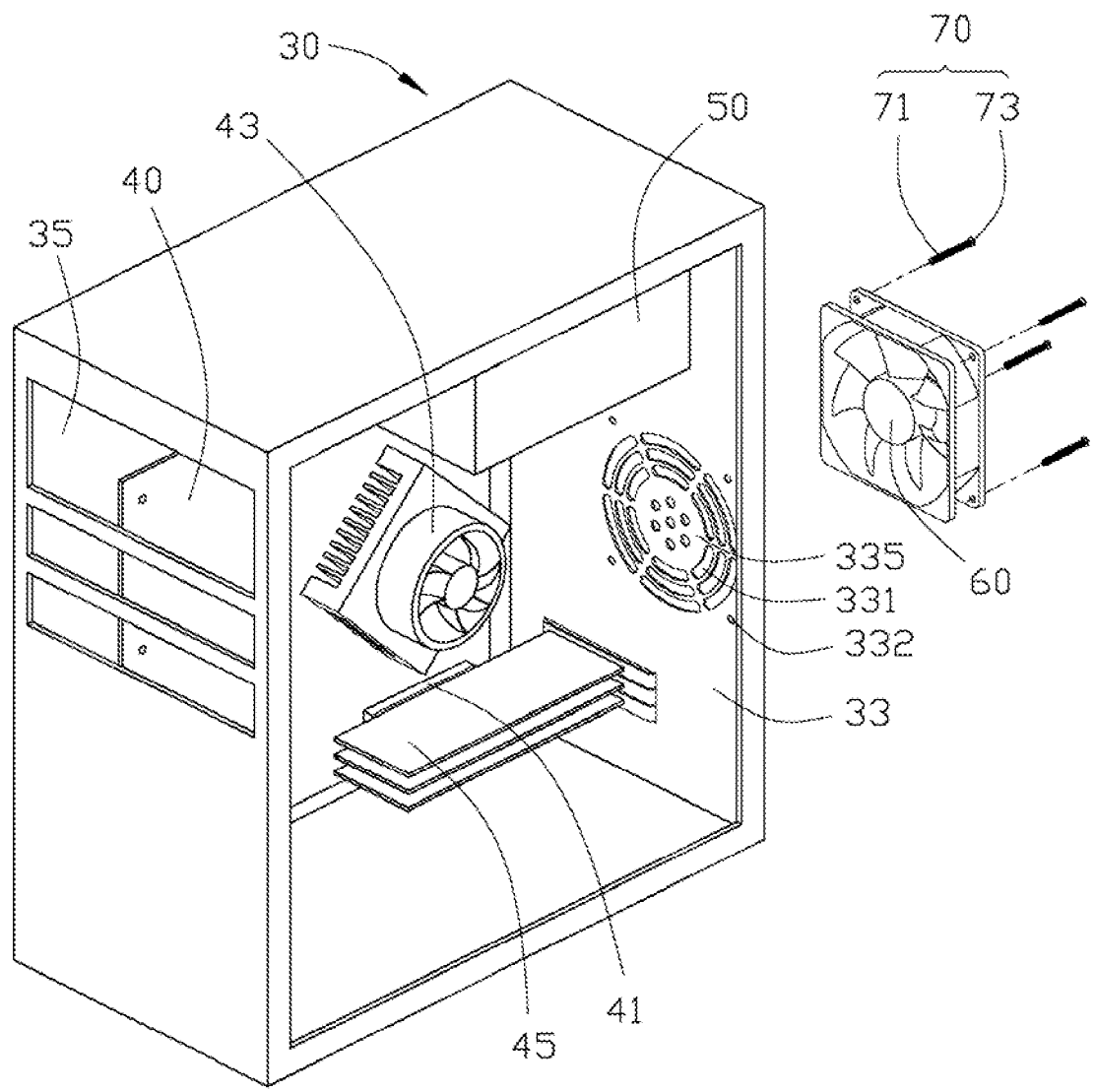
FIG. 1 is an exploded and schematic view of an embodiment of a electronic device enclosure.

Referring to FIG. 1, an electronic device enclosure 30 includes a rear plate 33 and a side plate 35 perpendicular to the rear plate 33. A right side of the enclosure 30 defines an opening, and a plate can be mounted there to cover the opening.

A power supply 50 is mounted in the enclosure 30. A fan is mounted in the power supply 50 to dissipate heat generated by the power supply 50. A motherboard 40 is mounted on the side plate 35 of the enclosure 30. The motherboard 40 comprises some electrical components, such as a CPU, expansion cards 45, mounted thereon. A CPU fan 43 is mounted on the CPU to dissipate heat generated by the CPU. The motherboard 40 defines a plurality of expansion slots 41 for the expansion cards 45 to be inserted therein. The expansion cards 45 generate much heat.

The rear plate 33 of the enclosure 30 defines a ventilation area 335 in which a plurality of ventilation slots 331 is defined. The ventilation slots 331 are used to communicate outside of the enclosure 30 with inside of the enclosure 30. Four plate screw holes 332 are defined at four corners of the ventilation area 335 correspondingly. The ventilation area 335 is located above the expansion cards 45.

Four adjusting screws 70 are capable of screwing into the plate screw holes 332 correspondingly. Each adjusting screw 70 includes a shaft 71 and a head 73. A plurality of external screw threads is formed on the shaft 70. The head 73 is used to conveniently drive the screw 70.

Figure 2:
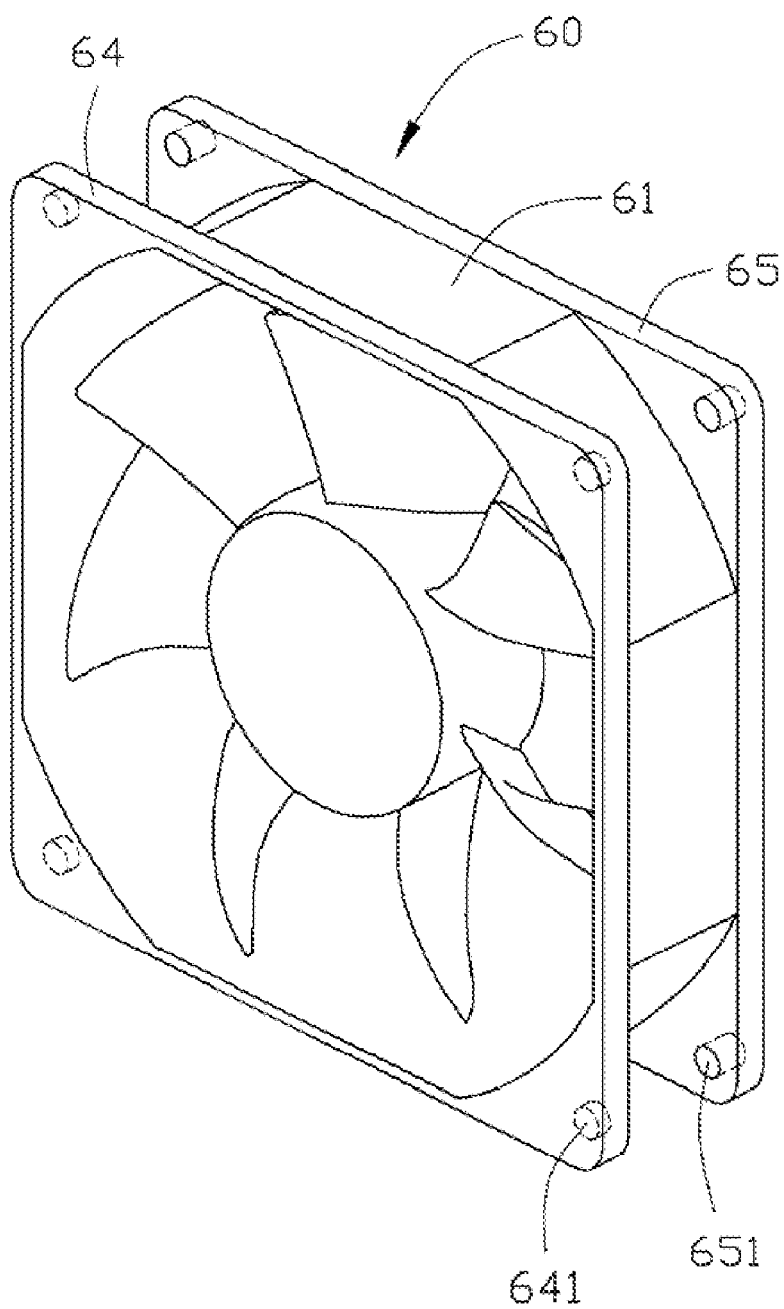
FIG. 2 is a schematic view of a fan of the electronic device enclosure of FIG. 1.

Referring to FIGS. 1 and 2, a fan 60 is mounted on the ventilation area 335 of the rear plate 33. The fan 60 includes a frame 61, which includes a first wall 64 and a second wall 65. The first wall 64 and the second wall 65 are parallel with each other. Four corners of the second wall 65 define four second screw holes 651 correspondingly. Each screw hole 651 extends through the second wall 65. Four corners of the first wall 64 define four first screw holes 641 correspondingly. Each screw hole 641 does not extends through the first wall 64.

Figure 3:
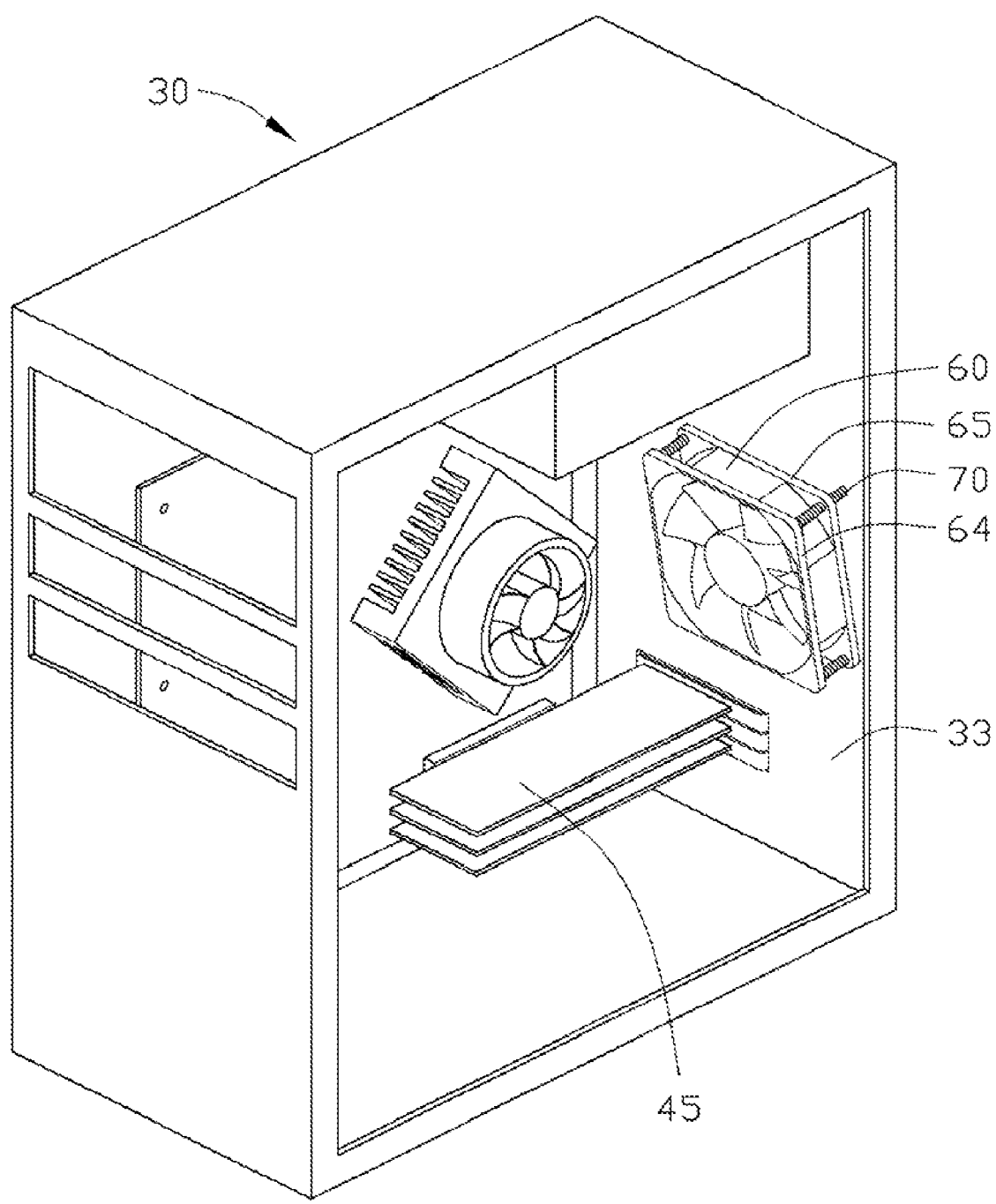
FIG. 3 is an assembled view of the electronic device enclosure of FIG. 1.

Referring to FIGS. 1 and 3, the second wall 65 of the fan 60 is mounted on the ventilation area 335 of the rear plate 33. The second screw holes 651 of the second wall 65 are in alignment with the plate screw holes 332 of the rear plate 33. Each adjusting screw 70 screws into corresponding plate screw hole 332 and second screw hole 651, and further screws into corresponding first screw hole 641 until a distal end of the adjusting screw 70 resists against the first wall 64. Therefore, the fan 60 is mounted on the rear plate 33 by the adjusting screws 70.

Then, two upper adjusting screws 70 of the four adjusting screws 70 continue screwing in the first screw holes 641 to push an upper portion of the fan 60 to incline towards the expansion card 45. Simultaneously, the rear plate 33 is slightly bent to have the two upper adjusting screws 70 inclined. Therefore, the fan 60 can drive air flowing to the expansion cards 45 to help the expansion cards 45 dissipate heat.

Figure 4:
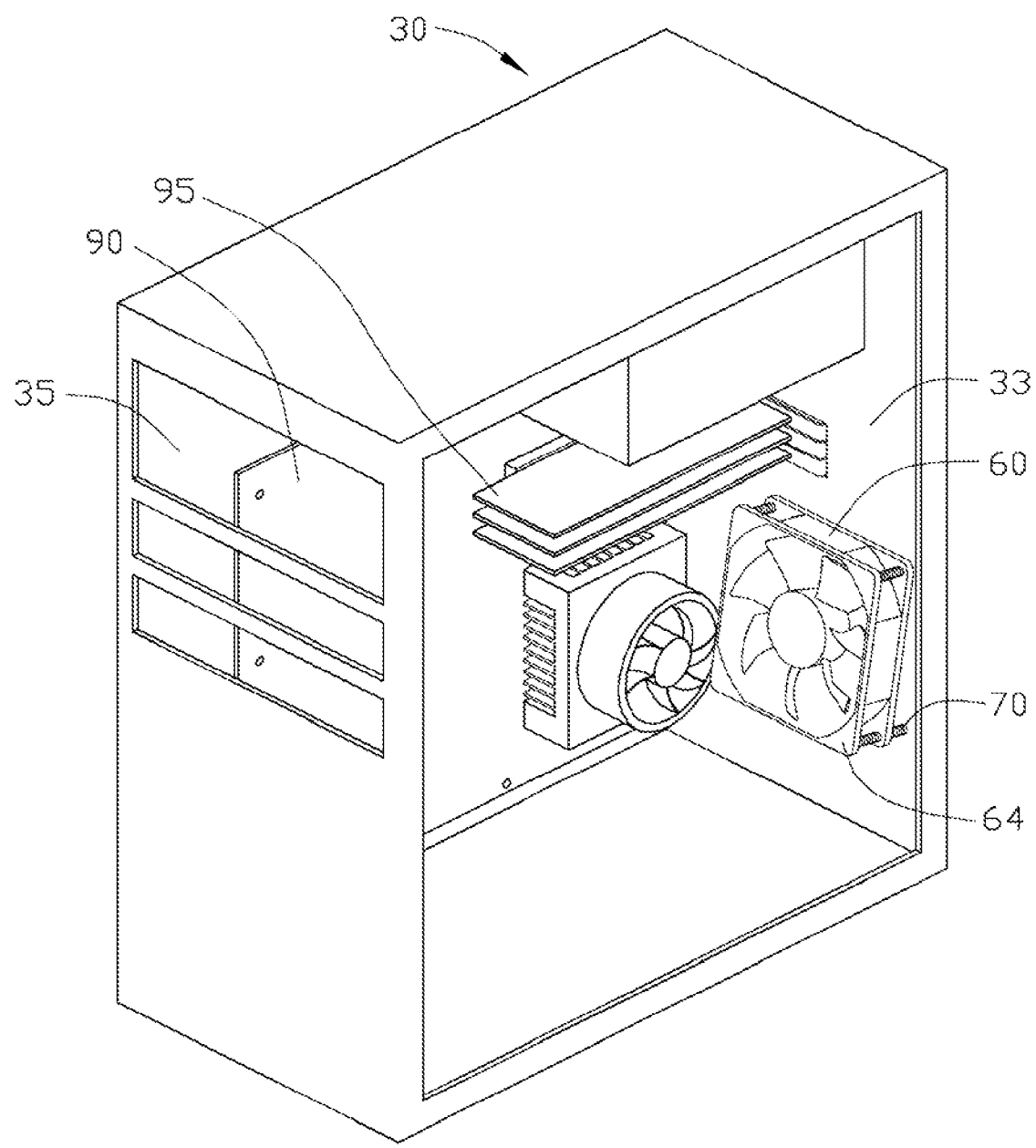
FIG. 4 is an assembled view of another embodiment of a electronic device enclosure.

Referring to FIGS. 1 and 4, another kind of motherboard 90 is mounted on the side plate 35 of the enclosure 30. The motherboard 90 comprises some electrical components, such as a CPU, expansion cards 95, mounted thereon. The expansion cards 95 generate much more heat. The expansion cards 95 are located above the ventilation area 335. The fan 60 is mounted on the rear plate 33 by the adjusting screws 70 screwing into the plate screw holes 332, the second screw holes 651, and the first screw holes 641. Two lower adjusting screws 70 of the four adjusting screws 70 continue screwing to push a lower portion of the fan 60 to incline towards the expansion cards 95. Simultaneously, the rear plate 33 is slightly bent to have the two upper adjusting screws 70 inclined. Therefore, the fan 60 can drive air flowing to the expansion cards 95 to help the expansion card 95 dissipate heat.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the present disclosure to the full extent indicated by the broad general meaning of the terms in which the appended claims are expressed.

What is claimed is:

1. An apparatus, comprising:
a side plate, a motherboard mounted on the side plate, the motherboard having a heat source attached thereon; and a rear plate perpendicular to the side plate, the rear plate defining a ventilation area, the ventilation area and the heat source located at different heights, a fan mounted on the ventilation area, the fan being adjustable to incline towards the heat source;

wherein the apparatus comprises a computer enclosure which comprises the side plate and the rear plate, the rear plate defines a plurality of plate screw holes, a plurality of adjusting screws screw into the plate screw holes to resist against the fan, a length of each adjusting screw extended into the computer enclosure is variable to adjust an angle and direction of the fan.

2. The apparatus of claim 1, wherein the fan comprises a frame which comprises a first wall, the first wall defines a plurality of first screw holes which do not extends through the first wall, each adjusting screw screws in corresponding first screw hole to resist against the first wall of the fan to push the fan inclining.

3. The apparatus of claim 2, wherein the heat source is a plurality of expansion cards attached on the motherboard, the plurality of expansion cards are located below the fan, an upper portion of the fan is pushed to incline towards the plurality of expansion cards.

4. The apparatus of claim 2, wherein the heat source is a plurality of expansion cards attached on the motherboard, the plurality of expansion cards are located above the fan, an lower portion of the fan is pushed to incline towards the plurality of expansion cards.

5. The apparatus of claim 2, wherein the frame comprises a second wall which is parallel to the first wall, the second wall defines a plurality of second screw holes corresponding to the first screw holes of the first wall, each second screw hole extends through the second wall, each adjusting screw in sequence screws in corresponding plate screw hole, the second screw hole, and the first screw hole.

6. The apparatus of claim 1, wherein the ventilation area defines a plurality of ventilation slots to communicate outside of the enclosure with inside of the computer enclosure.

7. An electronic device enclosure, comprising:
a heat source mounted therein;
a rear plate defining a ventilation area; and
a fan mounted on the ventilation area, the fan and the heat source located at different heights, the fan being adjustable to incline towards the heat source;

wherein the rear plate defines a plurality of plate screw holes, a plurality of adjusting screws screw into the plate screw holes to resist against the fan, a length of each adjusting screw located in the computer enclosure is variable to adjust an angle and direction of the fan.

8. The electronic device enclosure of claim 7, wherein the fan comprises a frame which comprises a first wall, the first wall defines a plurality of first screw holes which do not extends through the first wall, each adjusting screw screws in corresponding first screw hole to resist against the first wall of the fan to push the fan inclining.

9. The electronic device enclosure of claim 8, wherein the heat source is located below the fan, an upper portion of the fan is pushed to incline towards the heat source.

10. The electronic device enclosure of claim 8, wherein the heat source is located above the fan, a lower portion of the fan is pushed to incline towards the heat source.

11. The electronic device enclosure of claim 8, wherein the frame comprises a second wall which is parallel to the first wall, the second wall defines a plurality of second screw holes corresponding to the first screw holes of the first wall, each second screw hole extends through the second wall, each adjusting screw in sequence screws in corresponding plate screw hole, the second screw hole, and the first screw hole.

12. The electronic device enclosure of claim 7, wherein the ventilation area defines a plurality of ventilation slots to communicate outside of the enclosure with inside of the enclosure.

* * * * *